Nov. 26, 1957    D. J. CAMPBELL, JR., ET AL    2,814,416
SIDE SEAM FOR CAN BODY AND METHOD OF PRODUCING SAME
Filed Sept. 23, 1953    2 Sheets-Sheet 1

INVENTORS
DENIS J. CAMPBELL JR.
JOSEPH J. SPEROTTO
BY Charles H. Erne
Leland R. McCann
George W. Reiber
ATTORNEYS

INVENTORS
DENIS J. CAMPBELL JR.
JOSEPH J. SPEROTTO
BY
ATTORNEYS

2,814,416

SIDE SEAM FOR CAN BODY AND METHOD OF PRODUCING SAME

Denis J. Campbell, Jr., Western Springs, and Joseph J. Sperotto, Lombard, Ill., assignors to American Can Company, New York, N. Y., a corporation of New Jersey Application September 23, 1953, Serial No. 381,772

6 Claims. (Cl. 220—77)

The present invention pertains to a novel side seam construction for thin-walled, tubular metal cans made from sheet metal such as tin plate and a method of producing the same. More specifically this invention deals with a novel construction of the lap area of a lock and lap side seam whereby end seam difficulties encountered at this point are greatly reduced.

In the manufacture of sheet metal can bodies it is customary to join the longitudinal edges of the body blank by means of a lock and lap seam, the lap areas being those portions of the seam adjacent the peripheral end edges of the tubular can body. Each of these lap areas constitutes a reduction in thickness from the four layers of metal in the lock portion of the seam to two thicknesses. Such a reduction in thickness is necessary in order to reduce the amount of flange metal that is curled or bent into the end seam at this point. However, even this double thickness of metal causes many difficulties in the end seaming operation.

When solder is applied to the side seam to form a fluid tight joint, it must of necessity flow into and form a film between the layers of the lap area. Thus another thickness is added to the double thickness of metal. In the flanging operation of the can body wherein the marginal end portions of the cans are turned radially outwardly to receive similar flange portions of the can ends, the solder bond of the lap section tends to fracture due to the greater distance through which one lap layer of metal is curved relative to the other. This fracture breaks the continuity of the hermetic solder seal through which leakage occurs. Also in the end seaming operation, the seaming rollers, revolving at very high speeds, strike this raised or thickened portion of the lap area with a great deal of force causing excessive wear on the seaming rollers and a throwing or bouncing out of the seaming rollers so that a portion of the end seam immediately beyond this raised or thickened section is not firmly contacted by the end seaming rollers and thus creates another source of leakage. It is also obvious that whatever pressure is exerted by the end seaming rollers on the cover flange and associated single thickness body flange, this pressure will be multiplied about twice when it contacts the cover flange and the double thickness of can body flange at the lap area. This increase in pressure causes the end sealing compound to be forced away from the lap area leaving a bare metal to metal contact of the cover to the body at this point so that leakage may again occur.

The can making industry has long sought for a means by which this double thickness of metal in the lap area of the side seam could be reduced still further to approach the optimum of a single thickness of metal. It is of utmost importance that this result is not accomplished at the expense of speed of production.

The prior art disclosures attempts to achieve these results by means of butt welding the entire length of the side seam. Another method disclosed is to lap weld the entire length of the side seam. Still another method has been to taper the opposed lap edges so that when they are overlapped their combined thickness will be no more than the original, single thickness of plate. However, while each of these methods is operable when performed on heavy gauge plates and at slow speeds involving considerable hand manipulation, they have had little or no commercial success with tin plate because they cannot be performed at present day high speeds of upwards of 400 cans per minute.

In the butt welding method referred to above it has proved impossible to date to position or align rapidly the very thin sheets of tin plate so that their opposed edges contact firmly in a single line along the entire seam length. In the lap welding method referred to above, the practice has been either to weld the seam progressively, i. e. by means of rolling electrodes, or by a one shot weld, i. e. the entire seam simultaneously. The former has proved impossible at high speeds because either a stitch weld with gaps between the stitches is formed due to variations in the electrical energy or the heat builds up as the electrodes progress causing burning, extrusion and distortion of the plate. The latter is not feasible because even at slow speeds the irregularities in the plate, e. g. thickness, chemical composition, which invariably occur over the entire length of the side seam cause fluctuations in the electrical energy passing through the plates making a non-uniform, poor weld. The tapered lap method referred to above has also proved commercially unsuccessful because of the inability to form an accurate taper on the exceedingly thin stock and thereafter accurately overlap the opposed, tapered edges at high speeds.

After laborious and extensive experimentation and testing we have discovered that by so designing the notches in the corners of a can body blank, a lock and lap seam can be formed wherein the amount of overlap in the terminal portion of the lap section of the seam is very slight. This slight and critical overlap can then be welded and simultaneously compressed over its entire area to form a solidly welded lap portion of a thickness substantially less than the original two thicknesses of plate. Due to the interlocking of the hooks in the lock section of the seam, the laps can be rapidly and accurately positioned and held in place during the welding operation. In this manner end double seaming difficulties are greatly diminished if not obviated as proved by test records and the problem of fracture of the solder bond of the laps during flanging and seaming roll troubles are completely overcome.

It is therefore an object of the present invention to provide a metal can body having a lock and lap side seam, the lap sections having an outer portion completely welded and an adjacent inner portion thereof soldered.

Another object of the present invention is to provide a lock and lap side seam for a metal can body in which the layers of metal in the outer portion of the lap section overlap a critically minimal amount and are welded over this entire area of overlap.

It is a further object of this invention to provide a welded lap in a lock and lap side seam of a metal can which will not fracture during the flanging of the cans.

It is also an object of the invention to provide a welded lap in a lock and lap side seam of a metal can which is substantially reduced in thickness from the original two-layer thickness thereby greatly improving the hermetic quality of end double seams and avoiding wear and tear on double seamer rollers.

Still another object of the invention is the provision of a method of forming a novel and improved welded lap in the lock and lap side seam of a metal can.

Numerous other objects and advantages of the invention will be apparent as it is better understood from the following description, which, taken in connection with the accompanying drawings, discloses a preferred embodiment thereof.

Referring to the drawings.

Figure 6:
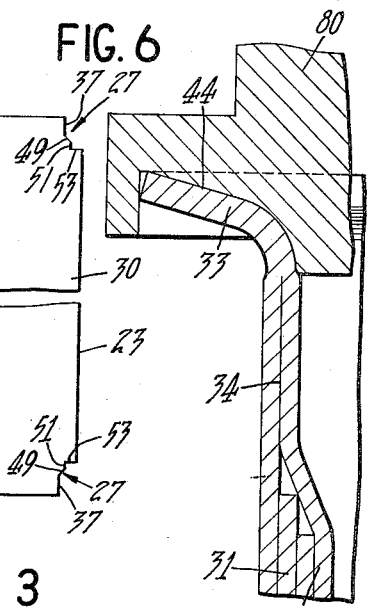
Figure 2:
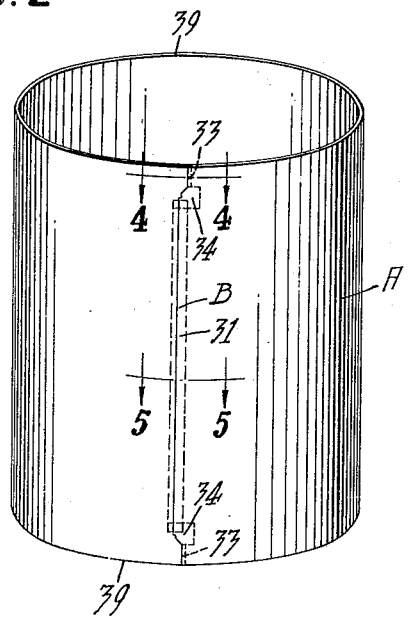
Fig. 2 is a perspective view of a can body made from the blank shown in Fig. 1.
Figure 4:
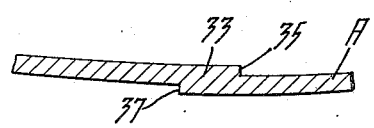
Figure 5:
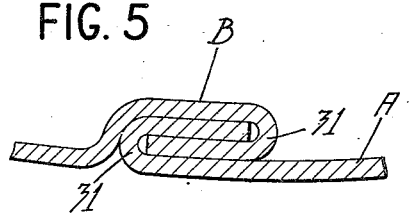

Figs. 4 and 5 are enlarged sectional views taken along planes indicated by the lines 4—4 and 5—5 respectively in Fig. 2 with parts broken away;

Fig. 6 is an enlarger fragmentary sectional view of the side seam of the can body after flanging and showing the length of the weld in relation to radial width of the flange, the view also showing a fragmentary portion of a conventional die for effecting the flanging operation; and Figs. 7 through 14 are schematic views showing the sequence of steps in forming the lock and lap weld can body side seam of the present invention.

Figure 1:
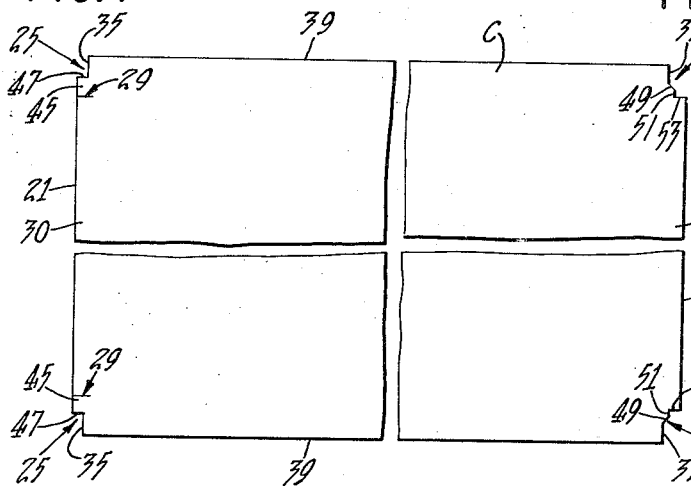
Figure 1 is a plan view of a body blank from which a can body embodying the present invention is made, with parts of the blank broken away.

As a preferred or exemplary embodiment of the instant invention the drawings illustrate a sheet metal can body A (Fig. 2) having a lock and lap side seam B. Such a can body is made preferably from a flat blank C (Fig. 1) having side seam edges 21, 23 formed with respective notches generally designated 25, 27. Also formed in edge 21 are slits 29. The notches 27 and slits 29 set off along the major portion of the seam edges, longitudinal sections 30 which are adapted to be formed into reversely bent hooks and interlocked to produce a lock seam section 31 for the body. In the seamed body, a pair of lap sections are located one adjacent each terminal end of the lock section 31 (Figs. 2 to 6) and consist of a welded outer lap portion 33 and a soldered inner lap portion 34.

Figure 3:
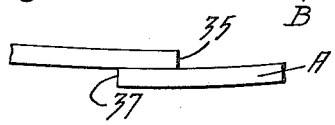
Fig. 3 is an enlarged fragmentary plan view of the outer lap area of the side seam of the can body prior to welding and compressing the laps.

The configuration and dimension of the lap sections are determined by the shape and size of the notches 25, 27. In the present invention, the shape of the notches 25, 27 is critical only in determining the configuration of the welded portion 33. For this purpose each notch 25, 27 has a vertical or longitudinal parallel edge 35, 37 terminating at the transverse, parallel end edges 39 of the body blank C. The vertical edges 35, 37 are spaced apart a specific distance slightly greater than the inside circumference of a fully formed unflanged body so that a predetermined minimal area of outer overlap will be defined between edges 35 and 37 in the terminal lap section of the side seam of the seamed body. This area of overlap is substantially less than the area of overlap of the body hooks in the lock section of the side seam as shown in Figs. 3 to 5. The longitudinal lengths of the notch edges 35, 37 are substantially the same and are substantially equal to the radial width of the flange 44 (Fig. 6) produced on the marginal ends of the body after the side seam is formed. By this construction a very small volume of metal is present in the lap area of the seam adjacent the marginal edges of the can body so that during the welding operation, more fully described hereinafter, sufficient temperature and pressure can be induced in the restricted layers of the lap area in an exceedingly short space of time to cause the layers to flow and bond firmly, thereby effectively reducing the thickness of the layers at this point.

It has been calculated that the amount or width of overlap best suited to carry out the present invention is in the range of from 0.030 to 0.060 of an inch and preferably about 0.040 of an inch. This dimensioning is critical and is measured circumferentially of the can between the adjacent edges 35, 37 as shown in Fig. 3.

It will be understood that the notch edges 35, 37 may be suitably located relative to either of the adjacent longitudinal edges 21, 23 as long as they are substantially vertical, substantially parallel to one another and the predetermined distance between them is maintained within the stated critical range.

To provide or set off the immediately adjacent soldered portion 34 of the lap area, a tab 45 is defined between the slits 29 and a transverse or horizontal inner edge 47 of notch 25. Notch 27 includes a sloping or inclined edge 49 extending from vertical edge 37 to another vertical edge 51 which merges with the inner end of a transverse or horizontal notch edge 53 which extends towards and terminates at the side seam edge 23 of the blank C. The area of overlap of the soldered portion 34 is substantially greater than that of the welded portion 33 (Fig. 2) so that the solder which forms a weaker bond than the weld may have a greater area of adhesive contact.

Figure 7:
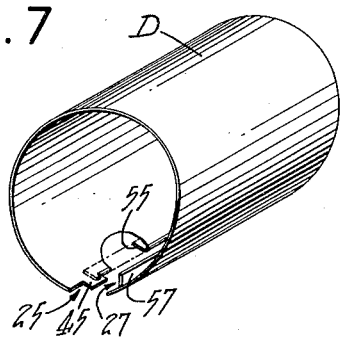
Figure 8:
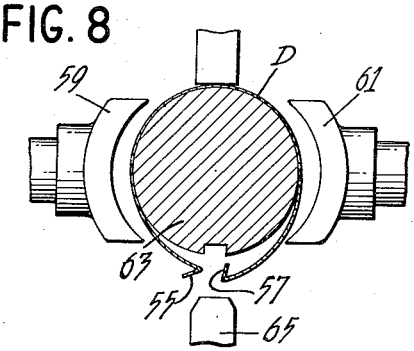
Figure 9:
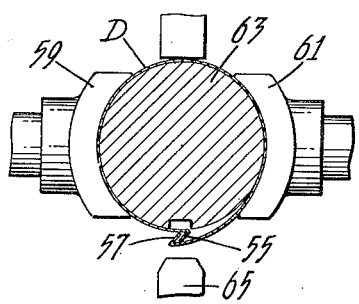
Figure 10:
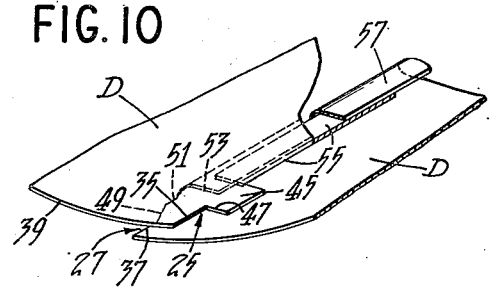
Figure 11:
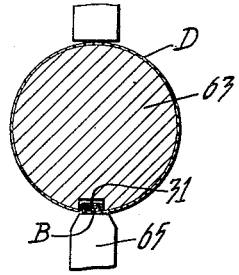

In the method of forming a can body having the side seam of the present invention as disclosed in Figs. 7 through 14 of the drawings, the body blank C is curled or rolled into tubular or cylindrical shape and has formed thereon reversely bent hooks 55, 57 in a well known manner as shown in United States Patent 1,770,041 issued July 8, 1930, to J. F. Peters on Roll Bodymaker to provide a partially formed tubular can body D (Fig. 7). By means of horizontally reciprocating wings 59, 61 disposed on opposite sides of a mandrel 63 supporting the can body D, the sides of the can body D are forced inwardly to assume a generally cylindrical configuration (Figs. 8 and 9). Simultaneously therewith hooks 55, 57 intermediately of the blank are forced into loose interengagement and the opposite end portions of the blank defined by the notches 25, 27 forming the welded and soldered lap area 33, 34, are disposed one above the other (Figs. 9 and 10). With the hooks 55, 57 and the notches 25, 27 so positioned with the longitudinal notch edges thus disposed in overlapped parallel relation, a vertically reciprocating hammer 65 bumps the side seam (Fig. 11) to firmly interlock the hooks 55, 57 whereby the lapped layers at each end thereof are rigidly held in a definite, predetermined position.

Figure 12:
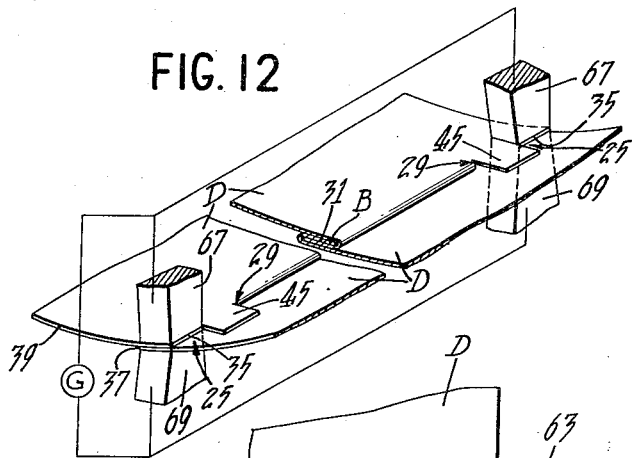
Figure 13:
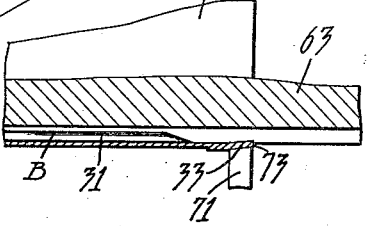
Figure 14:
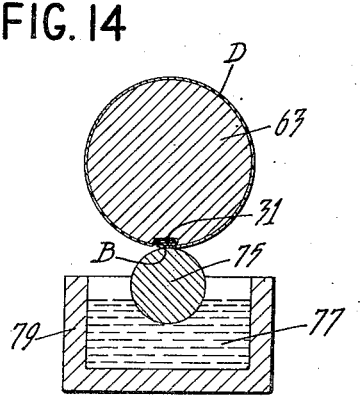

The can body with its interlocked side seam is then moved to a station where two pair of reciprocating opposed electrodes 67, 69 attached to any suitable source of electrical current contact the body layers in that area of the lap section along the length of and between the longitudinal edges 35, 37 of the notches 25, 27 (Fig. 12). As the electrical current passes through the opposed electrodes and the overlapped layers of body material therebetween, the material is raised to a temperature which reduces it to a molten or plastic state so that it will flow together to form an integral joint. This flowing together of the discrete layers of body material is assisted by the pressure exerted by the electrodes on each side thereof which pressure also has the effect of mashing down the plastic metal so as to reduce its overall thickness (Fig. 4).

In this manner each area 33 of the lap section is completely, simultaneously and substantially instantaneously welded and reduced in thickness by a single shot weld whereby no distortion, extrusion or burning of the body material occurs. Because the area welded is held within critical limits any irregularities in the plate are of no consequence. Due to the firm interlocking of the side seam lock section 31, the layers of body material forming the welded lap section 33 are accurately and rigidly positioned for the welding operation without the necessity of complicated external positioning means which would tend to reduce the speed of operation.

While the simultaneous welding of both end lap portions 33 is the preferred embodiment, it is also within the purview of the present invention to weld each end portion separately in consecutive order. This may be easily accomplished by moving the can body along in timed relation to the reciprocation of a single pair of electrodes 67, 69 rather than in timed relation to two pair of electrodes as illustrated.

Upon completion of the lap welding operation the leading edge 73 of the can body at its welded portion 33 (Fig. 13) is bent radially inwardly, slightly out of alignment with the remainder of the side seam to facilitate subsequent soldering of the lock section 31 and the inner lap sections 34 of the side seam. This bend in the leading edge of the seam prevents the very thin leading edge of the can body from scooping solder into the interior of the can body during the seam soldering operation. Bending of the seam edge 73 may be effected in any suitable manner, such as by a reciprocating hammer 71.

Soldering of the side seam preferably is effected by passing the seam longitudinally over a solder roll 75 which carries molten solder 77 from a solder bath 79 up to and onto the lock section 31 and the inner portions 34 of the lap sections of the can body side seam in the conventional manner, thereby completing the seal of the side seam. Thereafter each end of the can body is contacted by a pair of opposed flanging members 80 one of which is shown in Fig. 6, to turn the marginal end edges of the can body radially outwardly a distance approximately equal to the length of the welded portion 33 (Fig. 6) so that the can body may receive the end closure members.

The present invention in which the outer end of the lap section is completely welded is also applicable to cans having a non-metallic metal to metal adhesive or cement in the lock and inner lap sections of the side seam rather than the metallic solder described above. In the manufacture of a can of this type the cement is applied to one of the can body hooks prior to its interengagement with the other body hook. After bumping the side seam and welding the outer ends thereof a complete seal is produced through the entire side seam without the necessity of using a metallic solder.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

We claim:

1. A thin-walled tubular sheet metal can body terminating at its opposite ends in radially outwardly extending peripheral end seaming flanges, said body having a longitudinal side seam comprising an intermediate soldered lock section composed of opposed interengaged hooks extending throughout the major portion of the seam, said lock section terminating at its opposite ends in side seam lap sections extending therefrom to the opposite ends of said tubular body, said seam lap sections each including a longitudinally inwardly disposed soldered portion having a circumferential width at least equal to that of said lock section and terminating in a longitudinally outwardly disposed completely welded portion extending therefrom to a said can body end including the end seaming flange thereof, said lap seam section welded portions each having a circumferential width materially less than that of said lock section and having a thickness substantially less than the thickness of said soldered lap seam sections, whereby to facilitate securing can end members to said tubular body in hermetic end seams.

2. The side seam construction set forth in claim 1 in which said circumferential width of said outer welded lap sections is in the range of 0.030 to 0.060 of an inch.

3. The method of forming a thin-walled sheet metal tubular can body, comprising the steps of overlapping and interengaging opposed longitudinal edges of a sheet metal blank by means of reversely bent hooks formed thereon extending throughout the major intermediate portion of said blank edges, simultaneously therewith overlapping circumferentially the smooth non-hooked ends of said blank edges to a transverse extent substantially less than the transverse overlap of said hooks, bumping the interengaged longitudinal edge hooks to interlock the same in a continuous side seam, and mash welding each of said non-hooked overlapped ends of the blank throughout their longitudinal extent to compress and fuse the same together in side seam end portions of materially reduced thickness for incorporation into can end seams.

4. The method defined in claim 3 including the additional step of bending said welded side seam portions slightly radially inwardly of said can body to prevent said one edge from scooping solder into the interior of said can body during high speed soldering of said side seam.

5. A method of forming a thin-walled tubular can body from a rectangular sheet metal blank having opposite parallel longitudinal side seam edges and spaced parallel transverse end edges extending therebetween, said can body having its opposite peripheral ends extending radially and laterally outwardly in end seaming flanges, said method comprising the steps of overlapping and interengaging the opposed longitudinal edges of said blank by means of hooks formed thereon extending throughout the major intermediate portion of said longitudinal blank edges, simultaneously therewith overlapping the smooth non-hooked outer end portions of said longitudinal blank edges to a transverse extent substantially less than the transverse overlap of said hooks, bumping the interengaged longitudinal hooks to interlock the same in a continuous side seam, simultaneously and substantially instantaneously pressure welding the outer end portions of each of said overlapped blank edges throughout their longitudinal extent to compress and fuse the same together while in a softened condition to materially reduce the thickness of such relatively narrow overlapped side seam portions, soldering the unwelded portions of said side seam including the interlocked hook portions thereof, and finally bending the opposite ends of the tubular can body radially outwardly to form can end seaming flanges each comprising the aforesaid welded side seam end portions of reduced thickness.

6. The method of forming a thin-walled tubular can body from a flat rectangular blank of sheet metal having opposed parallel longitudinally extending side seam edges, comprising variably notching the four corners of the flat blank so that longitudinal notch edges at opposite ends of one blank edge are disposed parallel to and spaced transversely inwardly from said one blank edge a distance greater than the transverse inward spacing of the corresponding longitudinal notch edges from the other blank edge, transversely slitting said other blank edge longitudinally inwardly of each of the spaced notches thereof, forming complementary hooks extending along the major intermediate portions of said blank edges by reversely bending the sheet metal disposed between the notches on said one blank edge and reversely bending the sheet metal disposed between said slits on said other blank edge, forming said sheet metal blank into a tubular can body by interengaging and bumping said hooks to form an intermediate interlocked side seam portion, thereby disposing and holding the body blank material longitudinally outwardly of said hooks in predetermined overlapping relation with the overlapped area of body blank material between the aforesaid longitudinal notch edges being of materially less width than the width of said intermediately disposed hooks, pressure welding said overlapped body edge portions of less width to compress and fuse the same together to constitute side seam end portions of materially reduced thickness for subsequent incorporation into can end seams, and soldering the interlocked and lapped side seam between the opposite welded ends thereof to complete said side seam.

(References on following page)

References Cited in the file of this patent

UNITED STATES PATENTS

| | | |
|---|---|---|
| 1,542,662 | Brenzinger | June 16, 1925 |
| 1,912,259 | Coyle | May 30, 1933 |
| 1,917,174 | Wilhelm | July 4, 1933 |
| 2,111,656 | Worthington | Mar. 22, 1938 |
| 2,170,638 | Hopkins | Aug. 22, 1939 |
| 2,268,303 | Punte | Dec. 30, 1941 |
| 2,342,109 | Atkinson | Feb. 22, 1944 |
| 2,424,188 | Pearson | July 15, 1947 |